United States Patent [19]
Pozniak et al.

[11] 3,785,152
[45] Jan. 15, 1974

[54] INLET THROTTLED AIR PUMP FOR EXHAUST EMISSION CONTROL

[75] Inventors: Donald J. Pozniak, Mt. Clemens; Robert M. Siewert, Birmingham, both of Mich.

[73] Assignee: General Motors Corporation, Detroit, Mich.

[22] Filed: Nov. 13, 1972

[21] Appl. No.: 305,985

[52] U.S. Cl. .............................................. 60/290
[51] Int. Cl. ......................... F01n 3/00, F02b 75/10
[58] Field of Search ...................... 60/289, 290, 307

[56] References Cited
UNITED STATES PATENTS

| 2,953,898 | 9/1960 | Cornelius | 60/289 |
| 3,086,353 | 4/1963 | Ridgway | 60/290 |

*Primary Examiner*—Douglas Hart
*Attorney*—J. L. Carpenter et al.

[57] ABSTRACT

A pressure operated control valve throttles the inlet to the engine driven air pump used to supply injection air for the emission control system of an internal combustion engine of a vehicle, the inlet to the air pump being throttled in relation to engine throttling.

8 Claims, 3 Drawing Figures

PATENTED JAN 15 1974

3,785,152

INLET THROTTLED AIR PUMP FOR EXHAUST EMISSION CONTROL

This invention relates to emision control systems for internal combustion engines and, in particular, to an inlet throttle air pump for exhaust emission control.

In recent years, increased emphasis has been placed on reducing the portion of unburned constituents, such as hydrocarbons and carbon monoxide, present in the exhaust gases emitted from internal combustion engines. One of the most effective arrangements devised to accomplish this reduction is by the use of an engine exhaust emission control system wherein additional air is injected into the exhaust gases to complete oxidation of exhaust hydrocarbons and carbon monoxide external to the engine. In such systems, it is common practice to use a separate air pump driven by the engine for this air injection.

However, in such systems the quantity of injection air relative to engine airflow must be accurately controlled for emission control systems that require close regulation of the exhaust air-fuel ratio, that is, [(engine airflow + injection air)fuel]. An air pump driven proportional to engine speed will deliver a quantity of air at each speed based on the characteristics of the air pump and the air pump inlet and outlet conditions. Since engine airflow is affected by throttling as well as engine speed, the airflow delivered by an engine driven air pump will not vary proportional to engine airflow when the engine is throttling. If the air pump is designed for correct airflow when the engine is throttled, the air pump will not provide sufficient air for less throttled or unthrottled operation. Conversely, if the air pump is designed to provide the desired airflow, during unthrottled engine operation, the air pump will deliver an excess quantity of air during throttled engine operating conditions. Either situation can prevent the optimization of an emission control system so that it is difficult to provide an exhaust emission control system which will effectively reduce to a minimum the emission of undesirable constituents in the exhaust gases during all modes of engine operation.

It is therefore the primary object of this invention to provide an engine exhaust emission control system whereby secondary airflow into this system can be effectively regulated as a function of engine operating conditions.

Another object of this invention is to provide an air injection arrangement for an exhaust emission control system whereby the secondary airflow to the exhaust emission control system is continuously modulated so as to provide an air-fuel ratio within the exhaust emission control system which will not change significantly with changes in engine speed or load.

These and other objects of the invention are attained in an engine driven air pump wherein the output of the pump is variable, the outlet being controlled by inlet throttling to the air pump through the use of a control valve assembly having differential fluid pressure actuated means to effect movement of a variable air valve in the air pump inlet, the differential fluid pressure signals being provided by engine intake manifold pressure and air pump inlet pressure.

For a better understanding of the invention, as well as other objects and further features thereof, reference is had to the following detailed description of the invention to be read in connection with the accompanying drawings, wherein.

Figure 1:
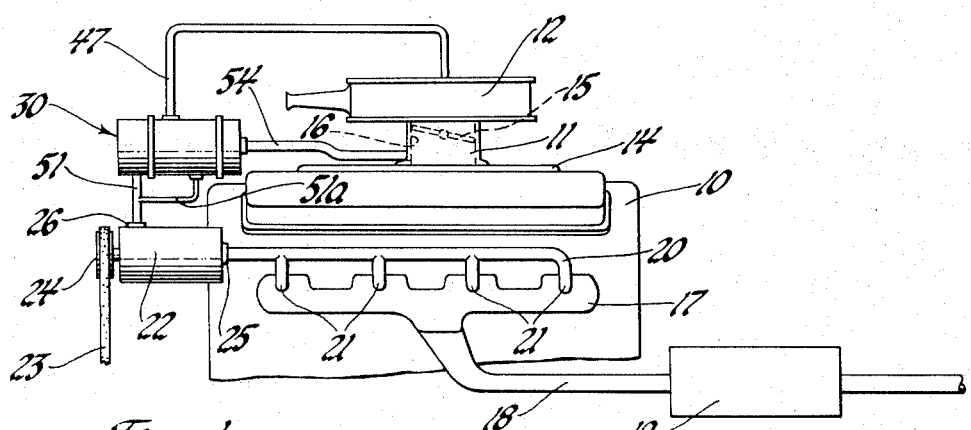
FIG. 1 is a schematic illustration of the internal combustion engine of a vehicle having an exhaust emission control system associated therewith, the system including an engine driven air pump with the inlet therethrough throttled in accordance with the invention.

Referring now to FIG. 1, there is illustrated an internal combustion engine 10 for a vehicle which is provided with a carburetor 11 and an air cleaner 12 mounted thereon to supply an air-fuel mixture to the intake manifold 14 of the engine, primary airflow through the carburetor to the engine being controlled by a throttle valve 15 pivotal within the induction passage 16 of the carburetor. Each bank of the cylinders of the engine is provided with an exhaust manifold 17 to receive the effluent from the cylinders and to define a combustibles flow path for this effluent, each exhaust manifold being connected to an exhaust pipe 18 which in turn is connected to a muffler 19. Each exhaust manifold 17 is preferably in the form of a thermal reactor with an outer housing, shown, and a double, concentric hollow tubular-type reactor core and radiation shield, not shown, positioned within the outer housing.

Each of the exhaust manifolds 17 has an air injection or induction unit in the form of an air manifold 20 positioned adjacent to it which is provided with a series of injection tubes 21 extending into the exhaust manifold and terminating downstream of and closely adjacent to the exhaust valve in each of the engine cylinders, not shown, whereby secondary air delivered through these injection tubes is injected into the stream of exhaust gases or combustibles flow paths adjacent to each of the exhaust valves of these cylinders.

An engine driven air pump 22 is used to deliver clean air to the air manifold 20. As shown, the air pump is mounted on the front of the engine 10 and is driven by the engine through a belt 23 and pulley 24 arrangement. The outlet port 25 of the air pump is connected to the air manifold 20 in a suitable manner and the inlet port 26 to the air pump is through a control valve or inlet throttle valve 30, in a manner to be described, whereby secondary airflow from the air pump is delivered through the air manifold and injection tubes to mix with the fuel and primary airflow previously inducted into the engine via the carburetor 11.

The control valve or inlet throttle valve 30, hereinafter referred to as the control valve, controlling air inlet into the air pump 22 may be formed integral with the air pump or, as shown, as a separate unit connected to the inlet port of the air pump.

Figure 2:
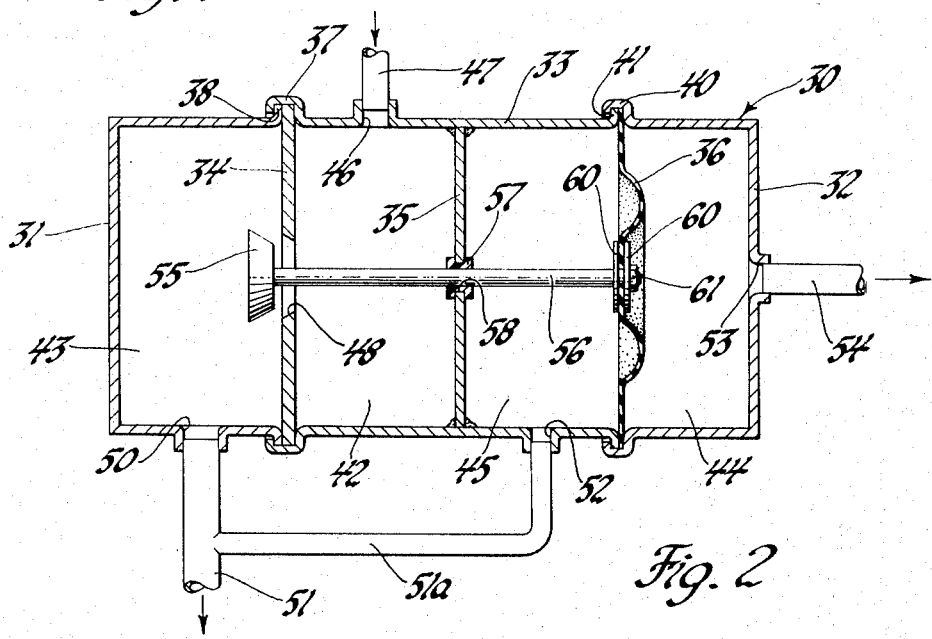
FIG. 2 is a schematic view in cross section of the inlet throttle control valve assembly of FIG. 1; and, FIG. 3 is a schematic view of an alternate embodiment of an inlet throttle control valve assembly in accordance with the invention.

The control valve in the embodiment shown in FIG. 2 includes a three-piece cylindrical, enclosed valve housing consisting of cup-shaped end members 31 and 32 and a cylindrical center member 33. These elements are suitably secured together to form a unitary structure with the interior thereof positioned by a valve seat 34, a partition plate 35 and a diaphragm 36, to form with the housing four chambers. As shown, the center member 33 is connected to the end member 31 with the valve seat plate 34 sandwiched therebetween by rolling over the radial flange 37 on the center member 33 over the radial flange 38 on the end member 31 and, in a similar manner, the end member 32 is secured to the center member 33 with the outer periphery of the diaphragm 36 sandwiched therebetween by rolling over the radial flange 40 of the end member 32 over the radial flange 41 on the opposite end of the center member 33 from flange 37. With this arrangement, there is provided within the valve housing a primary pump inlet chamber 42 and a secondary pump inlet chamber 43 divided by the valve seat plate 34 and, at its opposite end, with an intake manifold pressure chamber 44 and a pump inlet pressure chamber 45 separated from each other by the diaphragm.

The primary pump inlet chamber 42 is in communication via an inlet port 46 in the wall of center member 33 and conduit 47 to a source of clean atmospheric air such as the interior of air cleaner 12, for example, and with the secondary pump inlet chamber 43 via a valve controlled passage, the passage being a central aperture 48 in valve seat plate 34. Airflow from the secondary pump inlet chamber is via a discharge port 50 in the wall of end member 31 which is connected by conduit 51 to the inlet of air pump 22. The pressure chamber 45 is connected through a port 52 in the wall of center member 33 and a branch 51a of conduit 51 to the inlet of the air pump 22 and thus, also with secondary pump inlet chamber 43. Pressure chamber 44 is connected via a port 53 in end member 32 and a conduit 54 to airflow in the induction passage 16 downstream of the throttle valve 15 in carburetor 11.

Airflow from the primary pump inlet chamber 42 to the secondary pump inlet chamber 43 through the aperture 48 in the valve seat plate 34 is controlled by a poppet-type valve 55, the valve stem 56 of which is reciprocally journalled in the seal 57 extending through the central aperture 58 in partition plate 35. The valve stem at its end opposite the valve 55 extends through a central aperture in the diaphragm and is secured to the diaphragm for movement therewith by means of retainer plates 60 and a nut 61 fastened to the reduced threaded end of the valve stem.

With this arrangement, during engine operation, the control valve 30 throttles the inlet airflow to the air pump 22, driven by the engine 10, in accordance with the amount of engine throttling, the diaphragm of the control valve effecting movement of the valve 55 to control airflow to the air pump inlet and therefore, the secondary airflow from air pump 22. Engine intake manifold pressure acts on one side of the diaphragm 36 in manifold pressure chamber 44 and the inlet pressure to the air pump acts on the other side of the diaphragm in pump inlet pressure chamber 45. The intake manifold pressure is the control pressure and causes the positioning of the valve 55 to throttle the inlet to the air pump until the air pump inlet pressure equals the engine manifold pressure. By throttling the inlet airflow to the air pump 22 in this manner, there is provided continuous modulation of the secondary airflow to the exhaust system of the engine as a function of the primary airflow to the engine.

Figure 3:
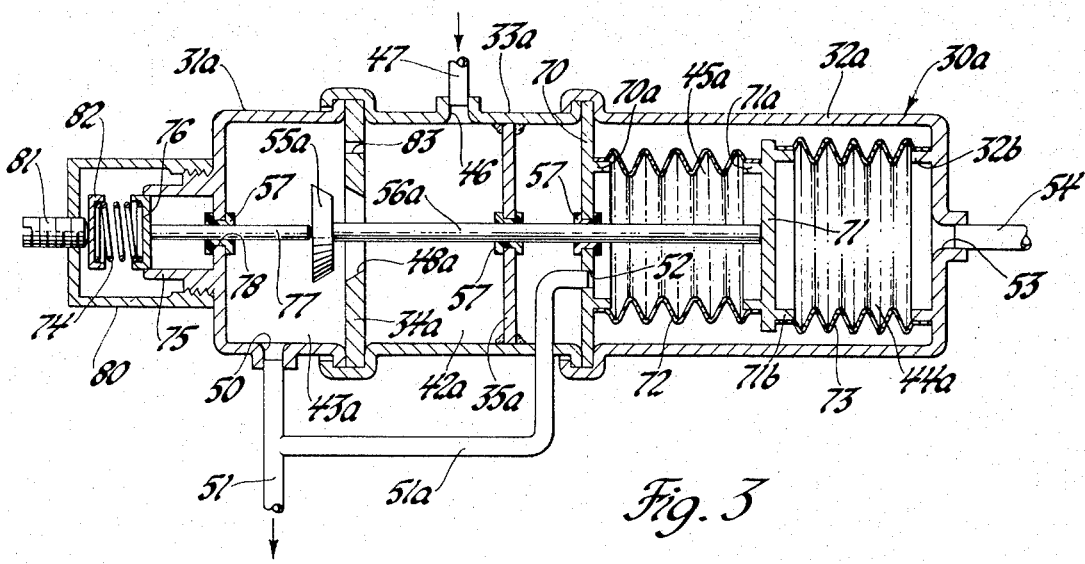

It is to be realized that the application of inlet throttling to an air pump 22 for emission control may differ in detail as dictated by particular emission control system requirements for a given engine. For this purpose, as by way of an example, there is shown in FIG. 3 an alternate embodiment of a control valve, designated 30a, wherein parts similar to parts of the structure of FIG. 2 are identified with similar reference numbers.

Control valve 30a includes a three-piece cylindrical enclosed valve housing consisting of cup-shaped end members 31a and 32a and a cylindrical center member 33a suitably secured together to form a unitary structure partitioned by a valve seat plate 34a and a partition plate 35a to form a primary inlet chamber 42a and a secondary inlet chamber 43a. In addition, a bellows support plate 70 is secured between end member 32a and center member 33a which together with an annular movable wall 71 and a pair of bellows 72 and 73 provide a manifold pressure chamber 44a and a pump inlet pressure chamber 45a within the valve housing.

As shown, bellows 72, which is tubular in form, is sealingly secured at opposite ends to the axial extending annular flanges 70a and 71a of the bellows support plate 70 and movable wall 71, respectively, and bellows 73 is similarly connected to the axial extending annular flanges 71b and 32b of the movable wall 71 and end member 32a, respectively. With this last described arrangement, the working areas on opposite sides of the movable wall 71 against which the control pressure, that is, the intake manifold pressure, and against which the pump inlet pressure act, can be appropriately selected, as desired, to effect the desired position of the valve 55a to control the flow area through the aperture 48a in the valve seat plate 34a.

In a manner similar to the structure of the control valve of FIG. 2, the inlet to the primary inlet chamber 42a of control valve 30a is via a conduit 47 and inlet port 46 with flow from the secondary inlet chamber 43a being via a discharge port 50 an conduit 51 to the inlet of the air pump 22. Manifold pressure chamber 44a is connected via port 53 and conduit 54 to the induction passage 16 of the engine 10 and, pump inlet pressure chamber 45a is connected via a port 52 in the bellows support plate 70 in the branch conduit 51a of conduit 51 to both the inlet of the air pump 22 and the secondary inlet chamber 43a, the branch conduit 51a extending out through the suitable aperture in the center member 33a between the partition plate 35a and the support plate 70.

In addition, a program spring 74 is used in the control valve 30a of FIG. 3 to provide a predetermined preload on the valve 55a which preload is dependent on the valve position. As shown, end member 31a is provided with an outward, axial extending guide cup 75 to slidably receive the annular spring abutment plate 76 secured to one end of a plunger 77 journalled in a sealed bushing 57 extending through the central aperture 78 in the end wall of the end member 31a to engage the valve 55a. A cup-shaped cover 80, suitably secured to the end member 31a as by being threaded to the guide cup 75 thereof, has an adjusting screw 81 threaded therein to engage a spring abutment plate 82, the program spring 74 being positioned between this axial, adjustable abutment plate 82 and the abutment plate 76 so as to normally bias the plunger 77 to effect closing movement of valve 55a relative to the aperture 48a.

With this arrangement, the scheduling of air injection by throttling the intake to the air pump 22 can be varied by the selective use of the working area on opposite sides of the movable wall 71 and by the use of a program spring 74 having a spring force, as desired. Operation of the control valve 30a to throttle the air to the air pump inlet is similar to that described for control valve 30 with positioning of the valve 55a by the fluid pressure acting on opposite sides of the movable wall 71 to effect positioning of the valve and by the biasing force of program spring 74.

In addition, valve seat plate 34a of the control valve 30a is provided with an orifice 83 of a predetermined size therethrough connecting primary inlet chamber 42a to the secondary inlet chamber 43a to thereby provide an internal air bypass circuit around the valve 55a controlled passage through aperture 48a to prevent a no-flow condition to the air pump 22 that may be harmful to some pumps.

What is claimed is:

1. An exhaust emission control system for use on an internal combustion engine having an intake manifold and, an exhaust manifold defining a portion of a combustibles flow path, said system comprising an air pump driven by the engine, said air pump having an inlet and an outlet, said outlet being operatively connected to the exhaust manifold for supplying air to the combustibles flow path for supporting burning of the combustibles, a valve housing having an air inlet and an air outlet connected to said air pump with said air outlet connected to said inlet of said air pump, valve means positioned in said housing between said air inlet and said air outlet for controlling the flow of air from said air inlet to said air outlet and, pressure responsive means operatively connected on one side in fluid flow relation to the intake manifold and on its other side operatively connected in fluid flow relation to the inlet of said air pump, said pressure responsive means being operatively connected to said valve means whereby said valve means is operated to modulate the flow of air through said air pump to the exhaust manifold as a function of primary airflow into the intake manifold of the engine.

2. An exhaust emission control system for use on an internal combustion engine having an intake manifold, and an exhaust manifold defining a portion of a combustibles flow path, said system comprising an air pump driven by the engine, said air pump having an inlet and an outlet, said outlet being operatively connected to the exhaust manifold for supplying air to the combustibles flow path, and flow control means including a housing divided by an apertured divider means to form a first chamber and a second chamber, the aperture in said divider means providing a flow passage between said first chamber and said second chamber, said first chamber having an air inlet thereto in communication with a source of clean air, said second chamber having an air outlet, conduit means connecting said air outlet to said inlet of said air pump, pressure responsive diaphragm means in said housing further dividing said housing into a third chamber and a fourth chamber, said third chamber being operatively connected in fluid flow relation to the intake manifold of the engine, said fourth chamber being operatively connected to the inlet of said air pump in fluid flow relation thereto and valve means movable relative to said aperture in said divider means to control the flow from said first chamber through said aperture to said second chamber, said valve means being operatively connected to said diaphragm means for actuation thereby.

3. An exhaust emission control system according to claim 2, wherein said flow control means further includes an adjustable program spring actuated means positioned to engage said valve means to bias said valve means to limit flow from said first chamber to said second chamber.

4. An exhaust emission control system according to claim 2, wherein said flow control means further includes an air bypass passage means around said valve means connecting said first chamber to said second chamber.

5. A control valve for use in the exhaust emission control system of an internal combustion engine having an intake manifold, an exhaust manifold means defining a portion of a combustibles flow path and, an air pump driven by the engine, the air pump having an inlet and an outlet with the outlet operatively connected to the exhaust manifold means to supply air to the combustibles flow path for supporting burning of the combustibles, said control valve including a valve housing having an air inlet and an air outlet, said air outlet being connected to the inlet of said air pump, valve means positioned in said housing between said air inlet and said air outlet for controlling the flow of air from said air inlet to said air outlet and means responsive to the induction pressure in the intake manifold on one of its sides and to the inlet pressure in the inlet of the air pump on its opposite sides connected to said valve means whereby said valve means is operated to modulate the flow of air through the air pump to said exhaust manifold means as a function of primary airflow into the intake manifold of the engine.

6. An inlet throttle control valve for use in the exhaust emission control system of an internal combustion engine having an intake manifold, an exhaust manifold means defining a portion of a combustibles flow path and an air pump driven by the engine, the air pump having an inlet and an outlet with the outlet operatively connected to the exhaust manifold means to supply air to the combustibles flow path for supporting burning of the combustibles, said control valve including a housing divided by divider means having an aperture therethrough to form a first chamber and a second chamber with said aperture providing a flow passage between said first chamber and said second chamber, said first chamber having an air inlet thereto in communication with a source of clean atmospheric air, said second chamber having an air outlet, conduit means connecting said air outlet to said inlet of said air pump, pressure responsive diaphragm means in said housing further dividing said housing into a third chamber and a fourth chamber, said third chamber being operatively connectable in fluid flow relation to the intake manifold of the engine, said fourth chamber being connectable to the inlet of the air pump, valve means movable relative to said divider means to control the flow from said first chamber to said second chamber, said valve means being operatively connected to said diaphragm means for actuation thereby.

7. An inlet throttle control valve according to claim 6 further including an adjustable program spring means biasing said valve means to limit flow from said first chamber to said second chamber.

8. An inlet throttle control valve according to claim 6 wherein said divider means includes an orifice passage therethrough for limited free flow of fluid from said first chamber to said second chamber.

* * * * *